United States Patent [19]
Sharrow

[11] Patent Number: 6,061,668
[45] Date of Patent: May 9, 2000

[54] CONTROL SYSTEM FOR PAY-PER-USE APPLICATIONS

[76] Inventor: John Anthony Sharrow, 7001 Old Redmond Rd., #J-339, Redmond, Wash. 98052

[21] Appl. No.: 08/967,671

[22] Filed: Nov. 10, 1997

[51] Int. Cl.[7] .................................................. G06F 17/60
[52] U.S. Cl. ........................... 705/400; 235/381; 700/9; 700/90; 700/232; 700/236; 700/237; 705/30
[58] Field of Search .................................. 235/375, 381, 235/382; 340/825.06, 825.07, 825.09; 364/138, 140.01, 140.02, 400, 479.01, 479.02, 479.06, 479.07; 705/1, 30, 400; 700/9, 11, 19, 28, 90, 231, 232, 236, 237

[56] References Cited

U.S. PATENT DOCUMENTS

| | | | |
|---|---|---|---|
| T104,003 | 3/1984 | Hal et al. | 340/825.08 |
| 3,383,467 | 5/1968 | New et al. | 379/102.07 |
| 3,858,181 | 12/1974 | Goldsby et al. | 340/870.05 |
| 4,412,282 | 10/1983 | Sedam et al. | 364/479.11 |
| 4,418,333 | 11/1983 | Schwarbach et al. | 340/310.01 |
| 4,510,778 | 4/1985 | Cotton | 68/12 R |
| 4,555,639 | 11/1985 | Melek | 307/38 |
| 4,999,763 | 3/1991 | Ousborne | 364/140.01 |
| 5,091,713 | 2/1992 | Horne et al. | 340/541 |
| 5,225,977 | 7/1993 | Hooper et al. | 705/41 |
| 5,280,423 | 1/1994 | Imai et al. | 364/140.06 |
| 5,386,362 | 1/1995 | Keret | 705/30 |
| 5,390,385 | 2/1995 | Beldham | 8/158 |
| 5,412,291 | 5/1995 | Payne et al. | 318/102 |
| 5,424,940 | 6/1995 | Ousborne | 364/130 |
| 5,450,938 | 9/1995 | Rademacher | 194/206 |
| 5,570,085 | 10/1996 | Bertsch | 340/825.07 |
| 5,586,174 | 12/1996 | Bogner et al. | 379/106.01 |
| 5,600,310 | 2/1997 | Whipple, III et al. | 340/825.06 |
| 5,619,614 | 4/1997 | Payne et al. | 706/1 |
| 5,694,323 | 12/1997 | Koropitzer et al. | 705/400 |
| 5,757,643 | 5/1998 | Kuroda et al. | 364/138 |
| 5,777,895 | 7/1998 | Kuroda et al. | 702/188 |
| 5,799,281 | 8/1998 | Login et al. | 705/1 |
| 5,859,778 | 1/1999 | Kuroda et al. | 364/474.11 |
| 5,997,170 | 12/1999 | Brodbeck | 700/236 |

*Primary Examiner*—Edward R. Cosimano

[57] ABSTRACT

An integrated electronic system consisting of a network of appliances and machines, such as clothes washers and dryers, vending machines, or other equipment, controlled from a central management computer. Each networked apparatus is uniquely identified, and is maintained in an inoperative standby state, until a prospective user has a valid account for payment, and authorizes stated charges to be billed to their account, or optionally has presented a charge card, thus paying for use of the respective appliance or machine. Account information is maintained and processed in the central management computer, which can be interactively linked to a separate billing system, property management system, or financial institution, thereby automating the verification and billing process. Message data can be sent to and displayed on any or all appliances and machines, a periodic polling of the network ensures security, and an audit trail is generated, with the operational history of each apparatus on the network. Operation of any or all appliances and machines on the network can be inhibited, on command from the central management computer, and the system has extensive maintenance and diagnostic capabilities.

20 Claims, 6 Drawing Sheets

CONTROL SYSTEM FOR PAY-PER-USE APPLICATIONS

CROSS-REFERENCES TO RELATED APPLICATIONS

Field of Search:

68/12, 194/205, 194/211, 194/217, 194/241, 194/302, 307/38, 307/40, 340/298, 340/299, 340/500, 340/517, 340/523, 340/635, 340/825, 364/138, 364/140, 364/221, 364/440, 364/479, 364/570, 364/921, 395/200, 395/325, 395/375, 395/650, 395/725

U.S. Patent Documents:

| | | | |
|---|---|---|---|
| 5,600,310 | February 4, 1997 | Whipple III, et. at. | 340/825 |
| 5,570,085 | October 29, 1996 | Bertsch | 340/825 |
| 5,424,940 | June 13, 1995 | Ousborne | 364/140 |
| 4,555,639 | November 26, 1985 | Melek | 307/38 |
| 4,510,778 | April 16, 1985 | Cotton | 68/12 |

FEDERALLY-SPONSORED RESEARCH/DEVELOPMENT

Not Applicable

Reference To Microfiche Appendix: Not Applicable

BACKGROUND OF THE INVENTION

The present invention relates to networks of appliances and other machines that are controlled by a central management computer. More specifically, it relates to appliances and other machines that are remotely activated, in response to the user's authorization to charge the costs incurred to the user's account, or the equivalent, through a central management computer which accomplishes the billing functions and also provides a number of additional control and monitoring capabilities.

In hotels, motels, resorts, and a variety of institutions, amenities have become a key part of efforts to attract customers and clients, and to increase revenues. Often, these are simple, relatively low cost items, such as coffee makers, that are provided for the user's convenience. More complex and expensive items such as laundry machines are not typically offered, however, despite their significant potential appeal. A primary reason is the difficulty of managing the use and maintenance of such equipment.

Conventional appliances and machines present an administrative dilemma, since there is no easy way to govern their use, and they can bring significant maintenance problems. Coin-operated machines have been around for many years, but they are expensive, too large to install in, for example, hotel rooms, and they don't alleviate the maintenance concerns.

Most current appliance and machine designs utilize microcontrollers to manage timing and control of the device's operation. With relatively minor hardware and software changes, these microcontrollers can be connected, via a network cable, to a central, file-server-type computer.

Concepts have been developed for networking appliances together, in a variety of ways, but none have addressed the requirements of these applications. Prior art has included systems to control coin-laundry washers and dryers, to control associated appliances from a single device, to selectively switch power to various machines, and to manage a variety of home appliances. However, there has been no known showing of a system designed to charge the use of an appliance or machine to a customer's existing billable account, and to meet the other specific needs of the hospitality industry.

SUMMARY OF THE INVENTION

The present invention provides an efficient and cost-effective means for controlling and monitoring a network of appliances or other machines from a central management computer, identifies individual appliances and machines by preset unique identification codes, and automatically charges customers for their use of the appliances and machines.

Another novel feature is the ability of this system to interact with other, independent computer systems, obtaining customer account verification data, and providing posting data which automatically debits the user's account for charges incurred through the use of an appliance or machine connected to this system.

It is a further object of this invention to simplify and expedite any required maintenance of the networked appliances and machines, which it accomplishes by implementing a number of diagnostic features. It also provides a means of verifying the functionality of the networked appliances and machines, ensuring their security, tracking their operational history, inhibiting their use whenever necessary, and transmitting messages and advertisements to users.

This system is designed to meet the needs of the hospitality industry, and can offer benefits in many other fields as well, by managing, for example, vending machines, car washes, fuel dispensers, and entertainment products.

BRIEF DESCRIPTION OF DRAWINGS

Other objects and aspects of this invention and advantages thereof will become apparent from the following description of a preferred embodiment, with reference to the accompanying drawings in which.

DETAILED DESCRIPTION OF THE INVENTION

Figure 1:
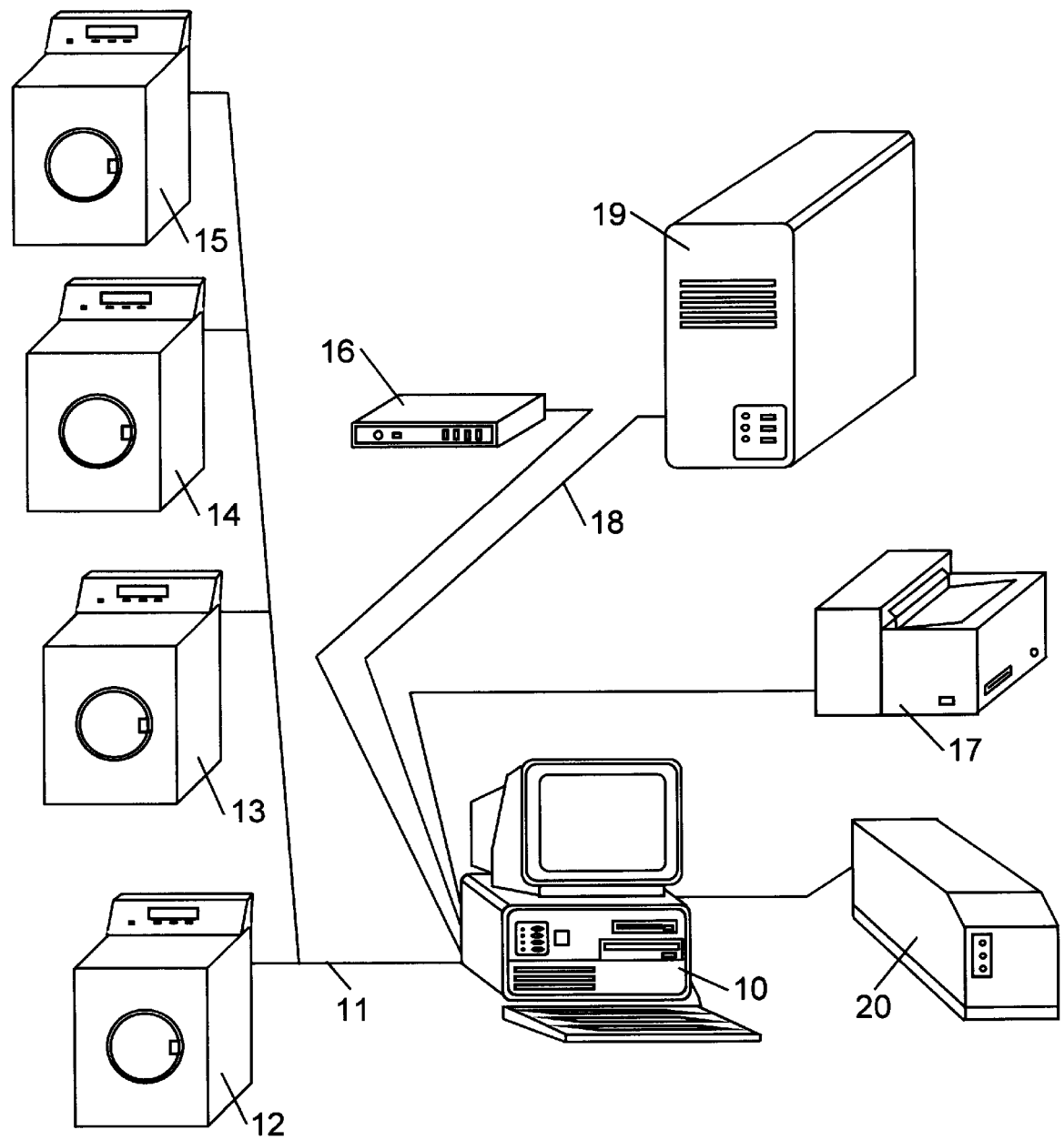
FIG. 1 is a block diagram of an embodiment of an appliance or machine control system according to the present invention.

As shown in FIG. 1, a preferred embodiment of the invention is comprised of a plurality of appliances or machines 12–15, each located in a specific location, a central management computer 10 equipped with a printer 17, modem 16, and uninterruptible power source 20, a network cable 11 which interconnects the appliances 12–15 and the central management computer 10, and a PMS data cable 18 which interconnects the central management computer 10 with the site's property management system 19.

The network type may be a Local Area Network, a high speed or low speed serial network, or a wireless network, depending on the system and site requirements. For a typical application, a high speed serial network is utilized and conventional interface hardware is employed for cost, installation, and standardization reasons.

Figure 2:
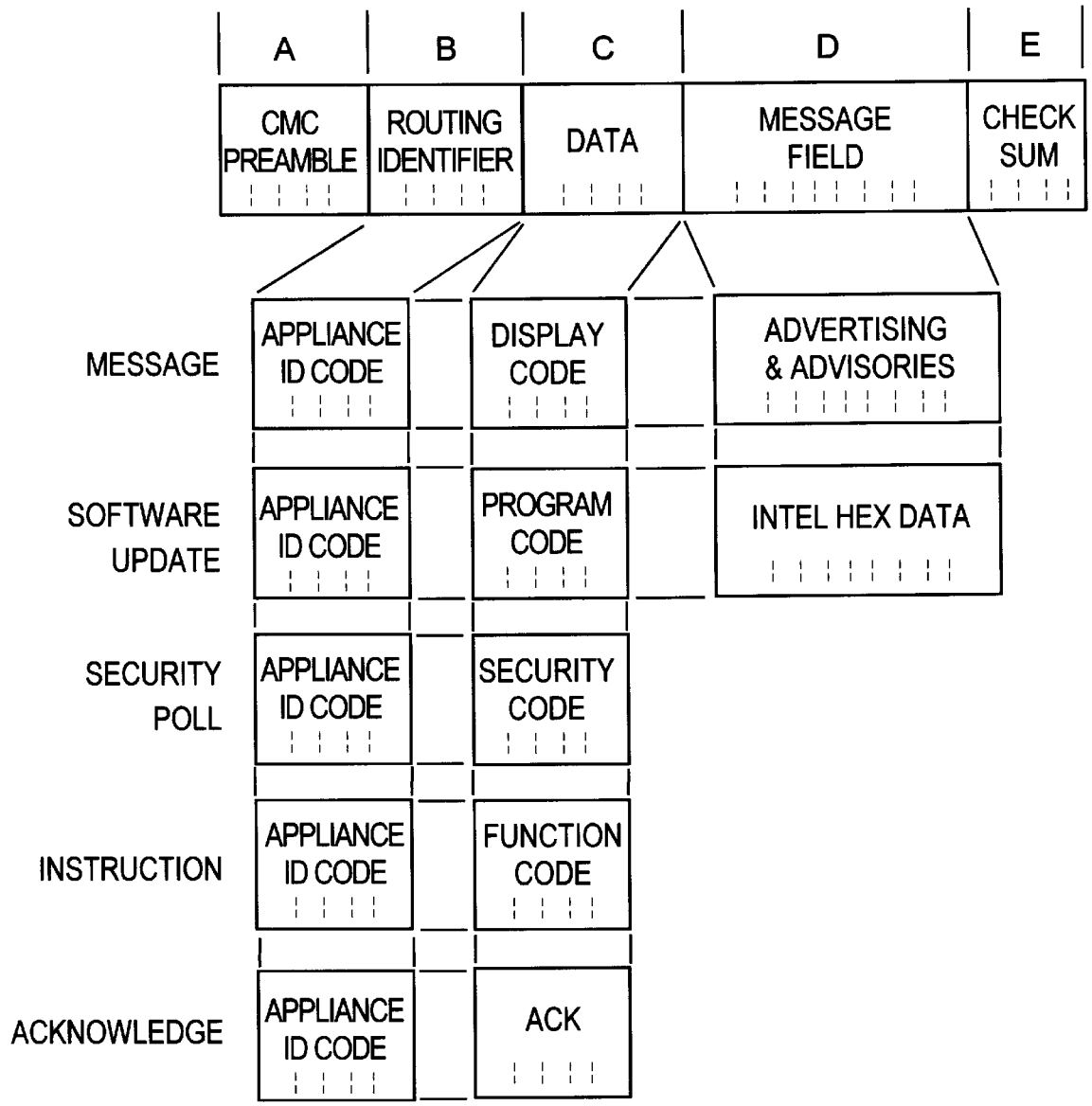
FIG. 2 represents a data message transmitted over the network by the central management computer to send an instruction or message to an appliance or machine on the system.

FIG. 2 shows an example of a data format used by the central management computer 10 to transmit instructions, acknowledgments, and messages to appliances and machines on the network. The first component of the data format is a preamble A that identifies it as a transmission from the central management computer 10, which has a higher priority than transmissions from appliances. Next is the routing identifier B which addresses an individual appliance or machine by its unique identification code. This is followed by the data field C and message field D. The last field E contains a checksum to protect data integrity.

The central management computer checks for an acknowledgment for each transmission sent, and sends an acknowledgment for every data transmission correctly received. In the event an acknowledgment is not received, the transmission is repeated a preset number of times, after which a maintenance report is generated, so that an inoperative appliance or machine, or network fault, is repaired promptly.

Figure 3:
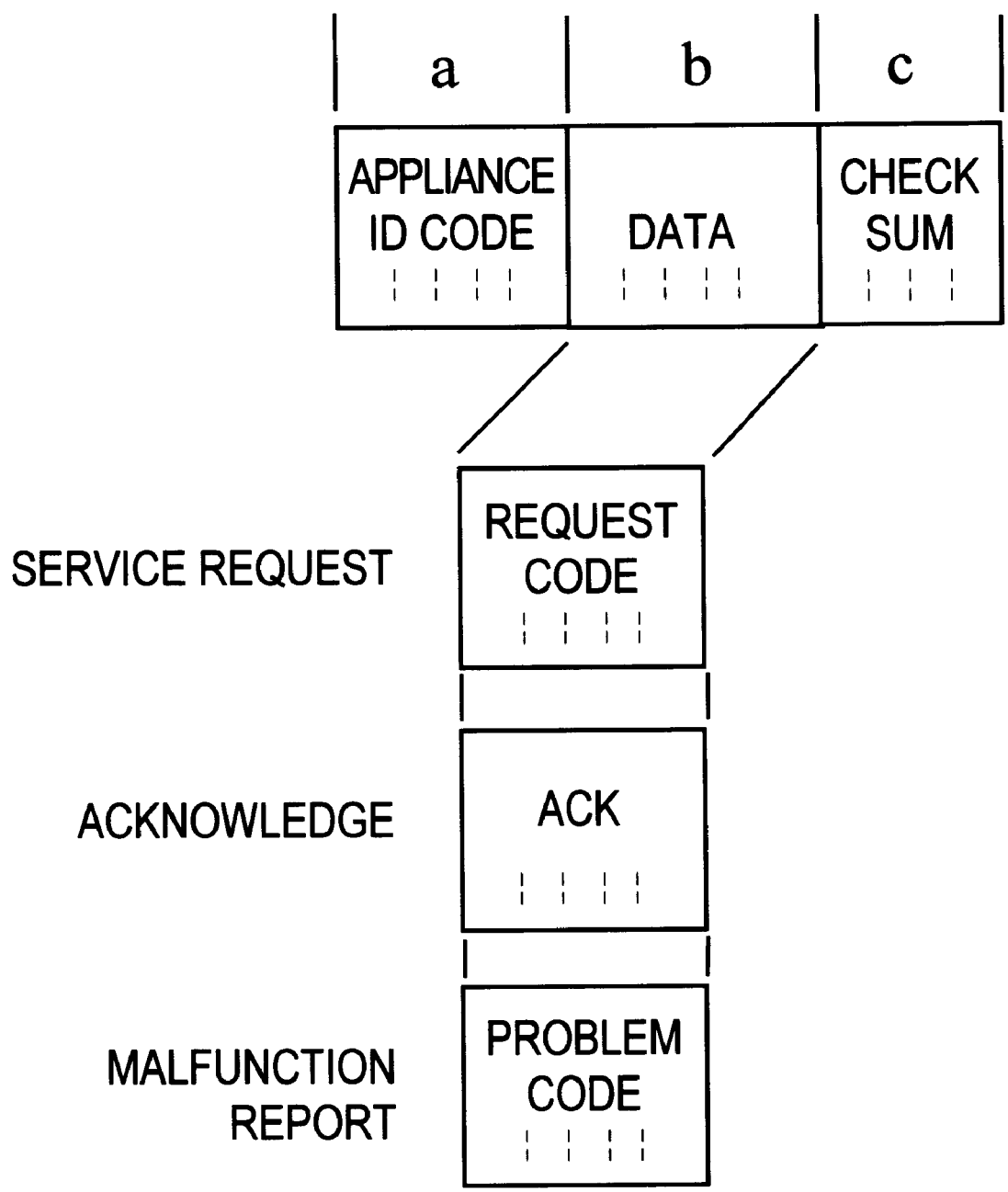
FIG. 3 represents a data message transmitted over the network by an appliance or machine to make a service request, to respond to a query from the central management computer, or to report a detected malfunction.

FIG. 3 is an example of the data format used by appliances and machines to transmit requests for service to the central management computer 10, to respond to instructions from the central management computer 10, and to report any malfunction detected by the appliance or machine controller's diagnostics.

The first field a contains the appliance's unique identification code. Next is the data field b, and the last field c contains the checksum. Like the central management computer, the appliance or machine controller checks for an acknowledgment for every data transmission, and retries a preset number of times if the transmission is not acknowledged. In the event an acknowledgment is still not received, the transmission is held in a buffer and retried at random time intervals until the data is received and acknowledged by the central management computer 10.

Figure 4:
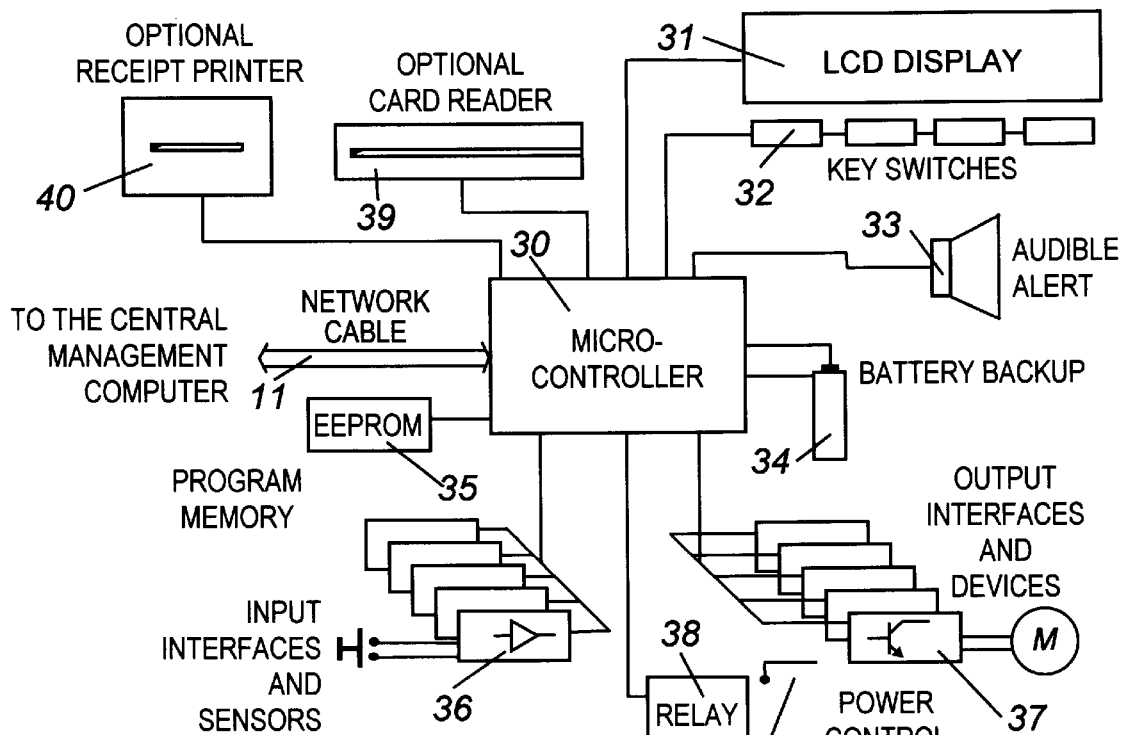
FIG. 4 is a block diagram of an appliance or machine controller with provisions appropriate for use with this control system.

Referring to FIG. 4, the controller in each appliance or machine incorporates a suitable interface for the network link, and its software is modified as required to implement the network communication interface and protocol, and to enable the central management computer 10 to control its operation. Depending on the type of appliance or machine involved, various switches and sensors may be used as inputs to the microcontroller, and the microcontroller outputs may drive motors, valves, heaters, and other devices.

The example shown in FIG. 4 is a controller appropriate for use in a variety of appliances and machines. Microcontroller 30 is the heart of this controller, managing all timing, control, and communications functions for this appliance or machine by executing software instructions stored in an electrically erasable programmable read only memory (EEPROM) or equivalent 35. The user interface for this machine is comprised of a liquid crystal display (LCD) or equivalent 31,which advises the user of choices available, actions required, system status, advisory messages, and other pertinent information, and the accompanying key switches 32, which allow the user to input commands to the controller. Audible alert 33 is used to call the user's attention to the LCD display 31, when important or urgent information is being presented.

As in appliances with conventional electronic controller/timers, operational data is fed to the microcontroller 30 by means of a number of input interfaces and sensors 36, which condition and buffer external signals from switches, mechanisms, and other devices, providing voltage levels acceptable for use by microcontroller 30.

Outputs from microcontroller 30 are presented to motors, pumps, heaters, and other devices at the required voltage and power levels by means of a number of output interfaces and devices 37. The 115 volt AC line input power to the appliance or machine is switched by means of power control relay 38.

Modifications of the controller hardware pertinent to this invention consist of a network interface as appropriate to connect to network cable 11, and backup battery 34. Card reader 39 and receipt printer 40 may optionally be added. Also required are software changes that incorporate the ability to communicate with the central management computer via the network interface, that implement a unique identification code for the appliance or machine, that request and require activation by the central management computer prior to running any operational cycles, and that add a number of additional, related features.

These related features include: the incorporation of an idle mode, which is activated during power failures, utilizing voltage from the backup battery 34 to save and retain all pertinent data, so that the appliance or machine can be restarted, by a command from the central management computer, at the point in the operational cycle when the power failure occurred;

the incorporation of self-diagnostics which can detect and report malfunctions via the network to the central management computer. Examples of such self-diagnostics include the use of an optical sensor to check for a broken belt, a sensor switch to ensure that a lint filter is properly installed, or a moisture sensor to detect water leaks. These diagnostic functions can also be invoked from the central management computer 10 to allow maintenance personnel to diagnose and troubleshoot reported problems;

the capability to display message data, sent from the central management computer 10 via the network, on the appliance's LCD display or equivalent 31 and to utilize the appliance's audible alert 33 to call attention to the presence of such message data;

the ability to respond, by sending the appliance's unique identification code, when polled via the network by the central management computer 10;

the capability to erase and reprogram the EEPROM or equivalent 35 via the network, on command from and with program code supplied by the central management computer 10; for security purposes the ability to suspend and inhibit all operations of the appliance or machine when so commanded, via the network, by the central management computer 10;

as an option, the capability to read data from optional card reader 39, to format such data and send it via the network to the central management computer 10, and to print charge confirmation receipts on optional receipt printer 40, in response to appropriate commands from central management computer 10.

Figure 5:
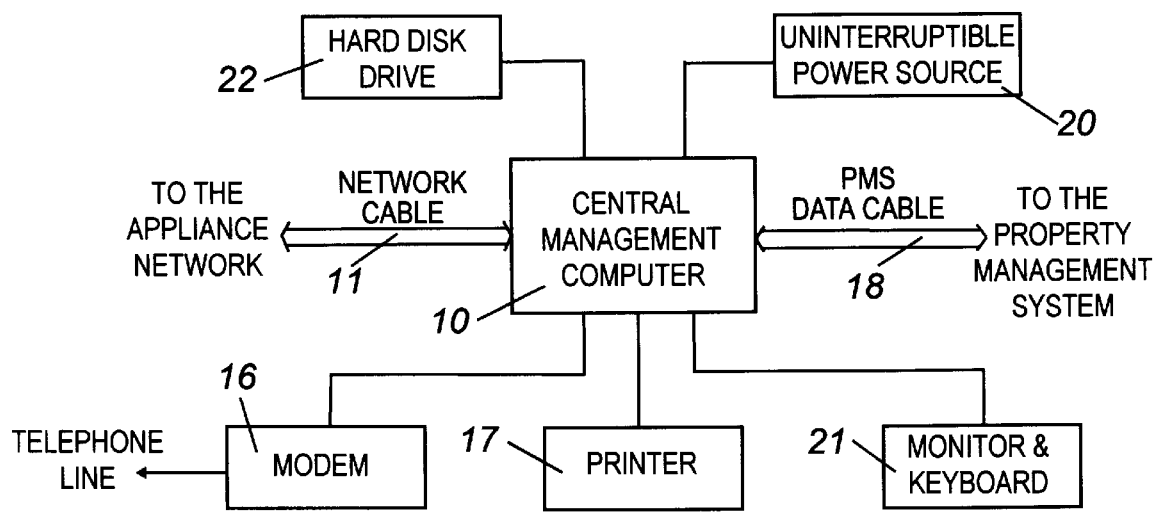
FIG. 5 is a block diagram of a central management computer, configured for use in an embodiment of this control system.

In FIG. 5, an embodiment of the central management computer system is shown. The central management computer 10 may be any type or model of computer with the required capabilities, but is typically a current technology, high performance IBM-compatible personal computer. It utilizes a hard disk drive 22 for data storage and may employ mirrored drives, a disk array, or other fault-tolerant storage means, for maximum data integrity.

The central management computer 10 is powered by an uninterruptible power source 20, for protection from AC power line disturbances and interruptions. In the event of a power loss, the uninterruptible power source 20 provides a signal to central management computer 10, advising of the condition. Central management computer 10, on receiving such a signal, takes appropriate action to save all active data and to close all files, and sends a command via the network to all appliances, instructing them to cease operations and to switch to idle mode. Upon receiving a signal from the uninterruptible power source 20 that the AC power input has returned to normal, the central management computer 10 waits for a preset time interval to minimize the probability of repeated shutdowns, then resumes normal operation and sends a command via the network, directing the appliances and machines 12–15 to also resume operation.

The central management computer 10 is linked to appliances and machines 12–15 connected to the system by means of the network cable 11 and is linked to the site's property management system 19 by means of the PMS data cable 18. Upon receiving a service request from an appliance or machine, central management computer 10 sends a query to the property management system 19 to determine if guests have registered in the room identified by the respective appliance's unique identification code, and whether the guests have a valid billing account and have authorized charges to their account for the use of this appliance or machine.

If these conditions are not met, the central management computer 10, via the network, sends a message to the respective appliance or machine 12–15, informing the users that they do not have a valid account, and advising the action to take if they wish to establish an account.

If the required billing conditions are met, the central management computer 10, via the network, sends a message to the users instructing them to select the appliance or machine cycle they wish to use.

When the users make a selection, the appliance or machine controller communicates this data to the central management computer 10 via the network. The central management computer 10 checks its database for the price to be charged for the appliance or machine cycle selected by the users, and sends a message to the users informing them that their account will be billed the stated amount for the selected use, and asking that they choose to proceed or to cancel.

In the event that they elect to cancel, a reset command is sent to the appliance or machine controller, in preparation for the next user selection.

If they elect to proceed, the central management computer 10 opens a transaction file that records the unique identification code of the appliance or machine, the cycle selected by the user, the price quoted, and the date and time the election to proceed was made, then the central management computer 10 sends an instruction to the specific appliance or machine, enabling it to run the cycle or mode selected by the user.

When the cycle is completed, the appliance or machine controller notifies the central management computer 10 that the selected cycle was completed successfully, then resets in preparation for the next user selection. The central management computer updates its billing database with information from the respective transaction file, closes the transaction file, formats the charge posting data, and sends it to the property management system 19 via PMS data cable 18. The property management system 19, via PMS data cable 18, returns a reply that the billing data was posted; in the event that this reply is not received, the central management computer 10 buffers the charge posting data and retries at periodic intervals, until a valid reply is received.

The central management computer 10, via the network cable 11, periodically, at random intervals, or at specified times polls each appliance and machine 12–15 on the network by its unique identification number, for security purposes.

The central management computer 10, in response to service requests from appliances and machines equipped with an optional card reader 39, places a call via modem 16 to a bank processing center or other financial institution to verify the validity and creditworthiness of the card being used. If the card is not accepted, the central management computer 10, via the network, advises the user accordingly and resets the appliance or machine's controller.

If the card is accepted, the central management computer 10 proceeds to process the transaction in the same manner as an account that is billed locally or through a property management system 19. The only exception is that when the selected cycle is completed, the central management computer 10 places a call via modem 16 to the bank processing center or other financial institution to bill the cost of the selected appliance or machine use to the card account, then sends a command and message to the respective appliance, via the network, directing the controller to print a charge confirmation for the user, using the optional receipt printer 40.

The central management computer 10, via network cable 11, can send message data, such as advisories, announcements, or advertisements, to all appliances and machines on the network, or selectively to individual or groups of appliances and machines.

The central management computer 10, via network cable 11, can send a command to all appliances and machines on the network or selectively to individual or groups of appliances and machines, instructing them to inhibit or suspend all operations. This prevents the use of the networked appliances and machines during late hours, or in the event of an earthquake, sewer blockage, or other problem.

The central management computer 10, via network cable 11, can send a command to any appliance on the network, instructing it to execute specific diagnostic tests and to transmit the results of these tests back to the central management computer 10, via network cable 11. Utilizing modem 16, the diagnostic capabilities of the central management computer 10 can be controlled from remote locations. Reports of problems and results of diagnostics are provided through the use of printer 17, which can also be used to generate administrative reports and account invoices.

Program software in any or all appliances or machines on the network can also be updated through the central management computer 10.

The central management computer 10 generates an audit trail for each appliance on the network. This is an historical record of the utilization of the appliance, including the specific cycles that were run, problem reports, and maintenance actions.

In addition to its automated features, central management computer 10, through the use of monitor and keyboard 21, allows on-screen review of transactions in process, history files, user account status, and system diagnostics. Through the use of password-protected programs, it also allows account credits, special no-charge use of specific appliances and machines, and operatordirected diagnostic routines.

Figure 6A:
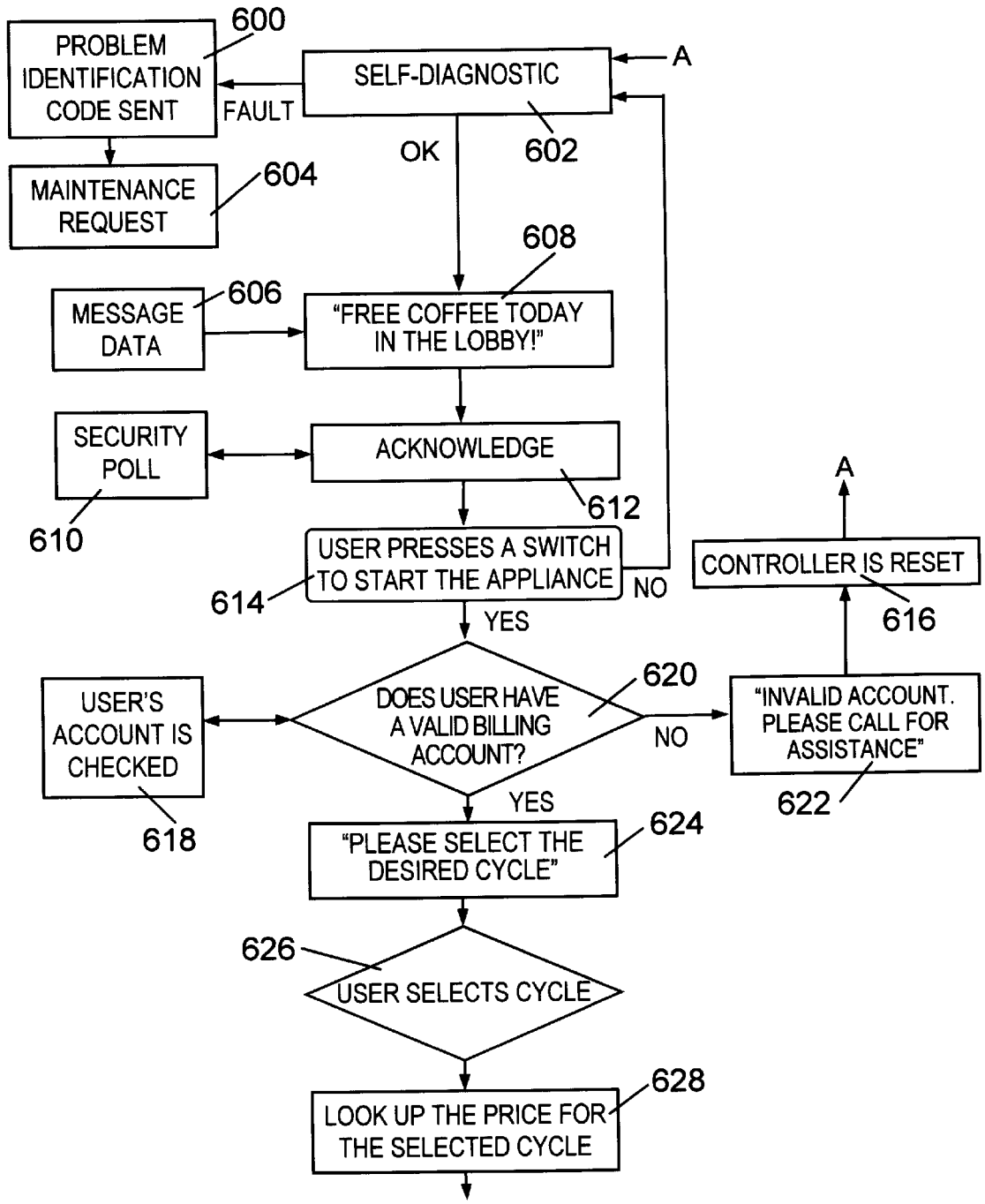
FIG. 6A and FIG. 6B show a flow chart useful in understanding the interaction of an appliance or machine controller, the central management computer, and a property management system, for a typical system transaction.
Figure 6B:
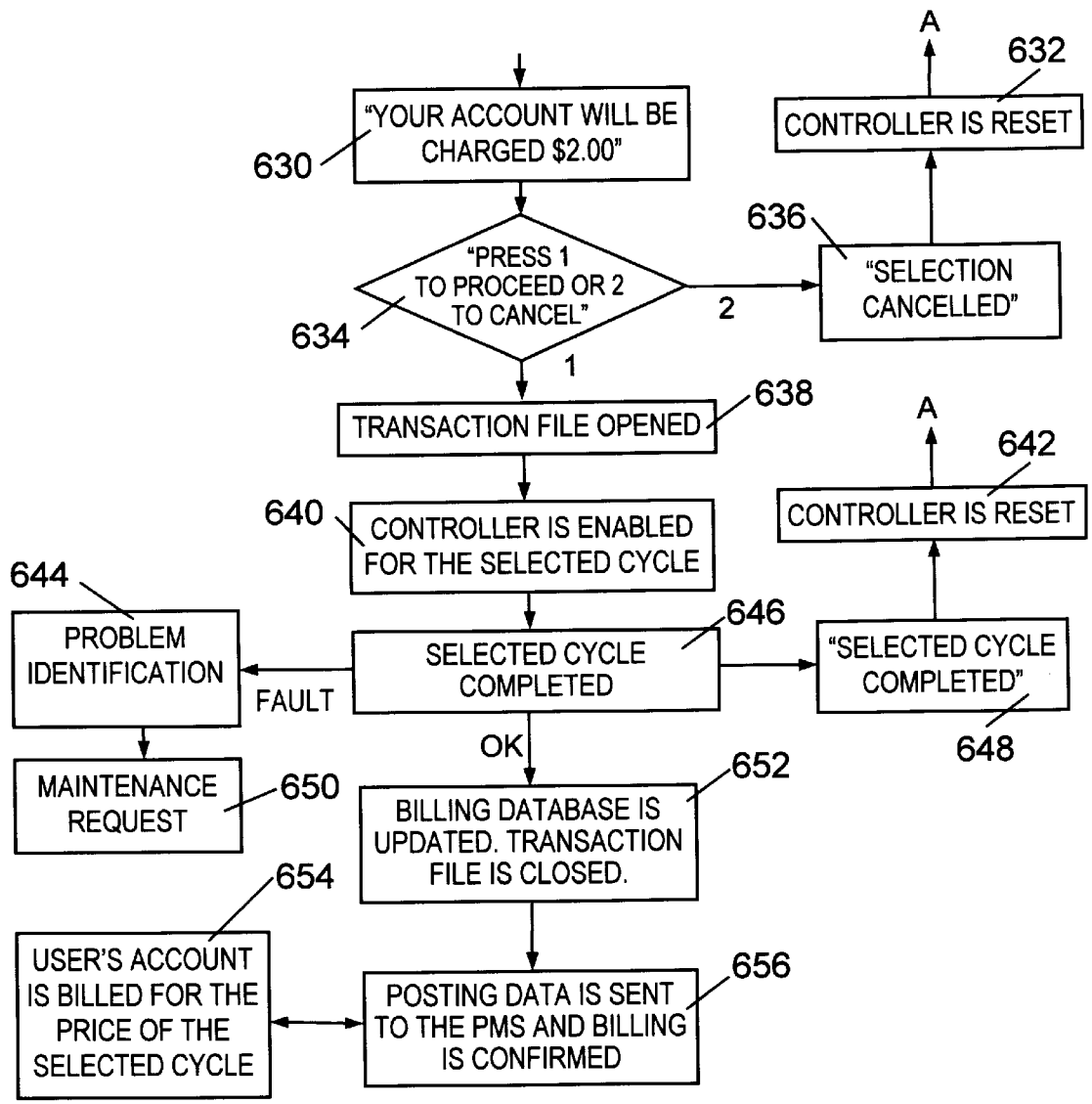

With a system configured as shown in FIG. 1 and referring to FIG. 6A and FIG. 6B, the following is a typical transaction interchange:

While waiting to be activated by a user, the appliance or machine controller responds 612 to security polling 610, receives 606 and displays messages 608, and performs self-diagnostic monitoring 602. In the event that the self diagnostic monitoring detects a fault, a problem code is sent 600 via the network to the central management computer, where a maintenance request 604 is generated. To activate the appliance or machine, the user presses a switch 614, indicating a desire to wash a load of clothes, on appliance 14, located in room #103.

The request is transmitted from appliance 14, via the network cable 11, to the central management computer 10.

The central management computer 10 sends a request for account verification 620, via PMS data cable 18, to the property management system 19.

The property management system 19 checks its data base 618 to see if a guest is registered in room #103, and if the registered guest has authorized charges for use of the clothes washer.

The property management system 19 replies, via PMS data cable 18, to the central management computer 10, in the affirmative or negative, depending on the information retrieved from its database.

If the central management computer 10 received a negative response from the property management system 19, a message is sent 622, via the network cable 11, to appliance 14, which is presented on the display readout of appliance 14, notifying that the user that the account for room #103 is not valid or use of the clothes washer has not been authorized, and that the user should contact the front desk at extension #808 for assistance. The controller is then reset 616, in preparation for the next user selection.

If the central management computer 10 received an affirmative response from the property management system 19, a message is sent 624, via the network cable 11, to appliance 14, instructing the user to select the desired wash cycle.

Appliance 14, via network cable 11, sends a request 626 to central management computer 10, indicating the wash cycle that the user has selected.

Central management computer 10 checks its Pricing Database 628 to determine the price to be charged for the wash cycle selected by the user.

Central management computer 10 sends a message, via the network cable 11, to appliance 14, which is presented on the display readout of appliance 14, notifying that the user 630 that the room #103 account will be billed $2.00 for the use of the clothes washer, and to press key #1 to proceed, or key #2 to cancel.

Appliance 14, via network cable 11, sends a response to central management computer 10, indicating whether the user has decided to proceed or cancel.

If the user has decided to cancel 636, the central management computer 10 sends a command, via the network cable 11, to appliance 14, instructing the controller to reset 632, in preparation for the next user selection.

If the user has decided to proceed, the central management computer 10 opens a transaction file for room #103 638, then sends a command 640, via the network cable 11, to appliance 14, instructing the controller to begin executing the selected wash cycle.

When the selected wash cycle is finished, appliance 14, via network cable 11, sends a response 646 to central management computer 10, indicating that the selected operations have been completed.

The central management computer 10 sends a command 648, via the network cable 11, to appliance 14, instructing the controller to reset 642, updates the central management computer billing database with the charges to room #103's account, then closes the room #103 transaction file 652.

The central management computer 10 sends charge posting data 656, via the PMS data cable 18, to property management system 19.

Property management system 19, via PMS data cable 18, sends a confirmation 654 to central management computer 10 that the charges were successfully posted to the room #103 account.

Central management computer 10 updates its billing database 656, indicating that the room #103 charges have been posted to the property management system 19. If the room #103 charges have not been successfully posted, the central management computer 10 holds this data in a buffer and continues to periodically send the posting data, via PMS data cable 18, to property management system 19, until an acknowledgment is received.

If any problems had been detected by the controller diagnostics during the wash cycles, appliance 14 would have sent, via network cable 11, a response 644 to central management computer 10, indicating the presence and nature of the problem, thus generating a maintenance request 650 for the clothes washer in room #103. The central management computer 10 would not update its billing database with charges to the room #103 account, and would keep the room #103 transaction file open until appliance 14 has been repaired and the selected wash cycle completed, or until this transaction is cancelled due to appliance 14 being inoperative. In any event, charges will not be posted to the property management system 19 until the central management computer 10 has verified that appliance 14 has successfully completed the wash cycle that was selected by the user in room #103.

While specific embodiments and examples of the invention have been illustrated and described herein, those skilled in the art will appreciate that various modifications and changes are possible, without departing from the true spirit and scope of the invention as disclosed in the accompanying claims.

I claim:

1. An integrated electronic control system providing accountability, management, and monitoring for customer use of self service appliances in various locations, said integrated electronic control system comprising:

a plurality of appliances, each capable of providing a user with at least one product or service;

each said appliance equipped with a programmable controller for regulating operations, managing timing, and effecting communications, said controller being networked enabled to allow data interchange with a programmable central management computer;

each said appliance interconnected via a network means to said central management computer for the purpose of data interchange, said central management computer being network enabled to allow data interchange with said controller;

said central management computer including a program means to control, monitor, and account for each use of each said appliance;

said central management computer including a data storage and retrieval means for accessing and maintaining program and data files;

each said appliance having a unique identification code, to allow said central management computer to individually address each said appliance and to identify data respective to each said appliance;

said controller including a program means and user interface means, to allow said user to activate said appliance and to select a desired product or service;

said controller including a program means for requesting and receiving authorization from said central management computer, prior to delivering said product or service;

said central management computer including a program means to respond to a user selection of said product or service by checking a user billable account status and, if said user billable account status is valid, sending a data transmission to said controller, authorizing the controller to enable said appliance to deliver said product or service;

said central management computer including a program means to generate a transaction data file for recording data pertinent to each use of each said appliance and to maintain said transaction data file pending verification that said product or service has successfully been delivered and that a corresponding billing entry has subsequently been successfully posted to said user billable account.

2. The system as defined in claim 1, further comprising:

said central management computer including a program means to respond to said user selection of said product or service by checking said user billable account status and, if said user account status is valid, responding to said controller with price data for said product or service.

3. The system as defined in claim 1, further comprising:

said user billable account status obtained and verified through interaction with an independent computer system, in which such information resides for other purposes;

said user billable account billing accomplished through interaction with said independent computer system.

4. The system as defined in claim 1, further comprising:

said central management computer including a program means to poll at least one said appliance, using said unique identification code, at a predetermined time, for the purpose of ensuring presence and function of said appliance;

said controller including a program means to respond to polling by sending said unique identification code.

5. The system as defined in claim 1, further comprising:

said controller programmed to perform at least one self diagnostic test, and to report a detected fault in said appliance to said central management computer, for appropriate maintenance action;

said central management computer having a capability to command said controller to execute said diagnostic test.

6. The system as defined in claim 1, further comprising:

said central management computer having a capability to send message data, such as advisories, announcements, or advertisements, to at least one appliance on the network;

said controller having a capability to automatically present said message data on a display means at said appliances.

7. The system as defined in claim 1, further comprising:

said central management computer having a capability to send a command to at least one appliance, instructing that all operations be suspended and inhibited;

said controller having a capability to suspend and inhibit all operations when so commanded by said central management computer.

8. The system as defined in claim 1, further comprising:

said central management computer having a capability to update a controller software program of at least one appliance, via the network means.

9. The system as defined in claim 1, further comprising:

said central management computer having a capability to generate an audit trail file for at least one appliance, to record total cycles, problem history, maintenance actions, and other historical data.

10. The system described in claim 1, further comprising:

at least one of said appliances equipped with a card reader and a receipt printer, said controller configured and programmed to allow data read from a credit or other card inserted into said card reader to be sent via said network means to the central management computer;

said user billable account billing accomplished through interaction with a user's existing credit card or other card account;

said central management computer verifies said existing card account, authorizes said controller to deliver said product or service, posts said charges to said existing card account via modem link to a bank processing center or other financial establishment after verifying delivery of said product or service, and, following verification of charge posting, sends a record of the transaction via said network means to said appliance, where it is printed on the receipt printer, providing said user with a printed receipt for the charge to their card account;

said central management computer verifies existence of a valid user credit card or other card account, via modem link to a processing center at a bank or other financial establishment, prior to authorizing said controller to deliver said product or service;

said central management computer verifies delivery of said product or service, then posts a respective charge to said user card account via modem link to said processing center;

following verification of charge posting, said central management computer sends a data transmission via said network means to said appliance, where said data transmission is formatted by said controller and sent to said receipt printer, providing said user with a printed receipt for said respective charge to said card account.

11. The system as defined in claim 1, further comprising:

said controller configured and programmed to support a battery-backed idle mode for protecting data in the event of a power interruption;

said idle mode suspending operation of said appliance and storing and preserving all pertinent operational data during said power interruption;

said controller configured and programmed to allow a restart following said power outage, said restart resuming normal operation at the point in a functional machine cycle at which said power interruption occurred;

said central management computer being powered from an uninterruptible power source, to prevent a power interruption from causing a loss of function of said central management computer, said uninterruptible power source providing a predetermined signal to said central management computer, advising said central management computer of a power loss condition;

said central management computer utilizing presence of said predetermined signal to determine that transaction files, billing files, audit trail files, and other data files are to be updated and closed, to prevent data corruption or data loss;

said central management computer utilizing the absence of said predetermined signal to signify that normal primary power is present;

said central management computer pausing for a predetermined time following the return of normal primary power, to ensure a continued availability of normal primary power before reopening data files, and resuming operation.

12. The system as defined in claim 11, further comprising:

said central management computer having a capability to send a command to said controller in at least one said appliance, instructing said controller to suspend operation by switching to said idle mode;

said central management computer having a capability to send a command to said controller in at least one said appliance, directing said controller to assume an operational state that existed whenf said power interruption occurred, and to resume normal operation.

13. A computer controlled method for managing and accounting for a use of at least one appliance through the use of a programmable central management computer interconnected with said appliance through a network means for the purpose of data interchange, said central management computer programmed to include a billing means for charging a user of said appliance for a user selected product or service derived from use of said appliance, comprising the steps of:

regulating operation of said appliance with a network enabled, programmable controller, said controller coupled to a user interface means;

programming said controller to identify said appliance to said central management computer by using a unique identification code as a part of all data transmissions sent to said central management computer;

programming said central management computer to verify existence of a billable user account in response to a user account verification request from said controller, and to respond to said controller with an approval or a denial, corresponding respectively to the presence or absence of said billable user account;

programming said central management computer to respond to a user selection of a product or service by generating a transaction file for recording data pertinent to each use of said appliance and to maintain said transaction file until said appliance has successfully delivered said product or service, and until a corresponding billing entry has successfully been posted to said billable user account.

14. The method as defined in claim 13, further comprising:

programming said central management computer to call up a predetermined price for said product or service from a pricing database and to transmit said price to said controller;

programming said controller to present said price to said user on a display means located at said appliance, following receipt of said price from said central management computer;

programming said controller to require said user to indicate, by a specific action, an acceptance of, or a decline to accept, said price as the charge to be billed to said billable user account, as payment for said product or service;

programming said controller to transmit an indication of said acceptance to said central management computer, following the performance by said user of said specific action;

programming said controller to cancel the selection of said product or service and reset in preparation for a new user selection, if said specific action indicates said decline to accept said price as payment for said product or service.

15. The method as defined in claim 13, further comprising: programming said controller to request verification of said billable user account from said central management computer, prior to allowing said user to select said product or service.

16. The method as defined in claim 13, further comprising:

configuring and programming said central management computer to obtain and verify said billable user account status through interaction with an independent computer system, in which such information resides for other purposes;

configuring and programming said central management computer to accomplish said billable user account billing through interaction with said independent computer system.

17. The method as defined in claim 13, further comprising:

programming said central management computer to poll at least one said appliance, using said unique identification code, at a selected or a predetermined time, for the purpose of ensuring presence and function of said appliance;

programming said controller to respond to polling by said central management computer by sending said unique identification code.

18. The method as defined in claim 13, further comprising:

configuring and programming said controller to support a battery-backed idle mode, to protect data in the event of a power interruption;

programming said idle mode to suspend operation of said appliance and to store and preserve all pertinent operational data during said power interruption;

configuring and programming said controller to allow a restart following said power interruption, said restart resuming normal operation at the point in a functional machine cycle at which said power interruption occurred;

powering said central management computer from an uninterruptible power source, to prevent a power interruption from causing a loss of function of said central management computer;

configuring said uninterruptible power source to provide a predetermined signal to said central management computer, advising said central management of a power loss condition;

programming said central management computer to update and close transaction files, billing files, audit trail files, and other data files upon detecting said predetermined signal, to prevent data corruption or data loss;

programming said central management computer to recognize the absence of said predetermined signal to signify that of normal primary power is present;

programming said central management computer to pause for a predetermined time following the return of normal primary power, to ensure a continued availability of normal primary power before reopening data files, and resuming operation.

19. The method as defined in claim 13, further comprising:

programming said controller to execute a self diagnostic routine and to report any detected anomalies to said central management computer, for appropriate maintenance action;

programming said central management computer to direct said controller in said appliance to execute said self diagnostic test;

programming said central management computer to send a message, such as an advisory, announcement, or advertisement, to at least one said appliance;

configuring and programming said controller to automatically present said message on said display means at said appliance;

configuring and programming said controller to emit an audible alert signal to signify that said message is present on said display means.

20. The method as defined in claim 13, further comprising:

programming said central management computer to send an instruction to at least one said controller, directing that said appliance suspend and inhibit all operations;

programming said controller to suspend and inhibit all operations of said appliance when so commanded by said central management computer;

programming said central management computer to send updated program software to said controller of at least one said appliance;

programming said controller to erase and reprogram an EEPROM or equivalent program memory, when so directed by said central management computer.

* * * * *